Nov. 29, 1949  H. KERSHAW ET AL  2,489,785
COFFEE MAKING APPARATUS
Filed July 11, 1945  2 Sheets-Sheet 1
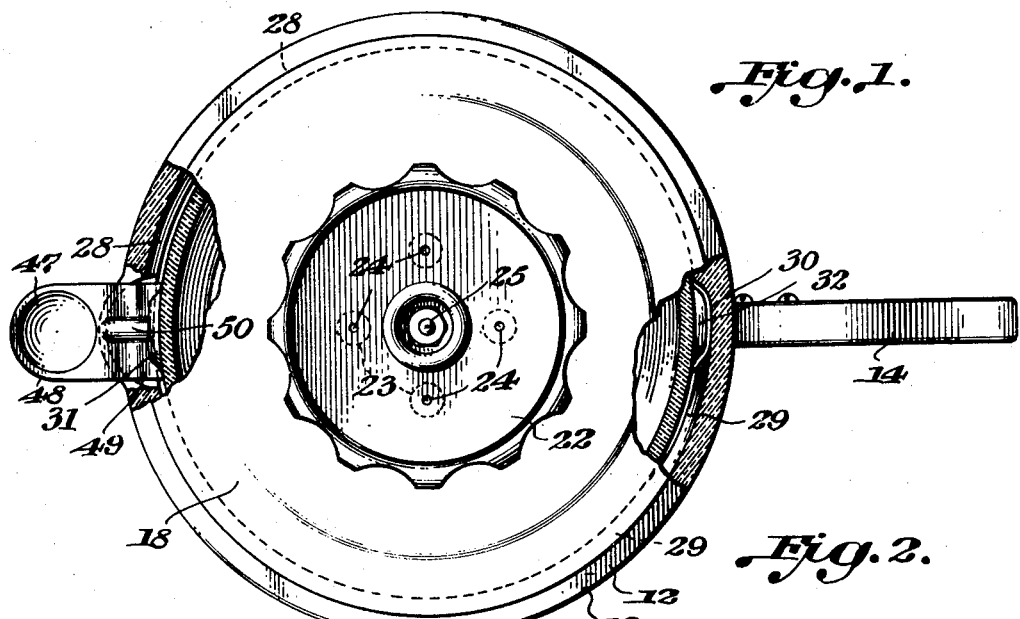
Fig. 1.
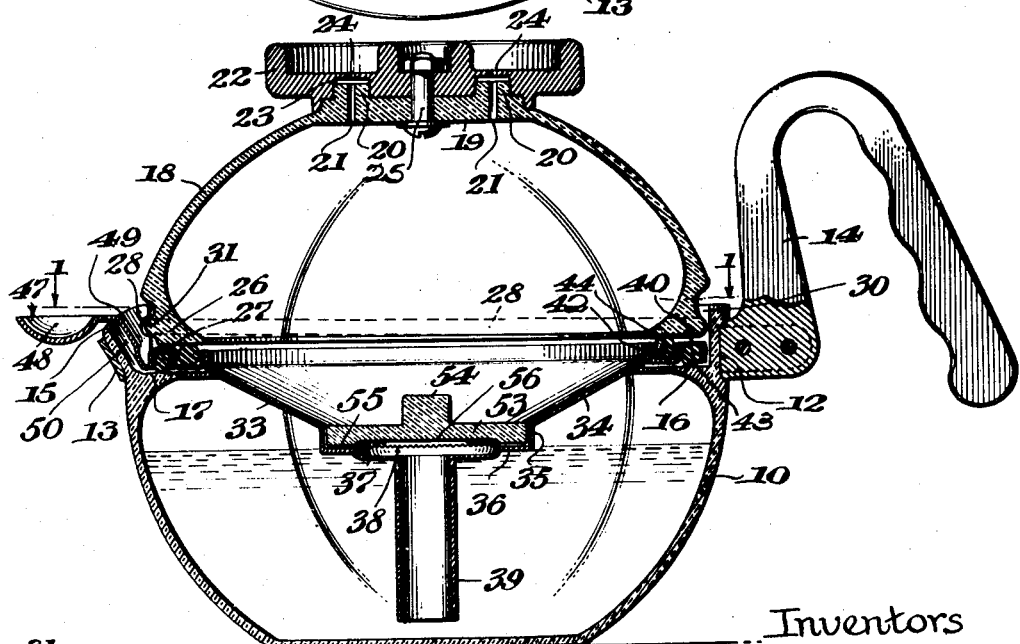
Fig. 2.
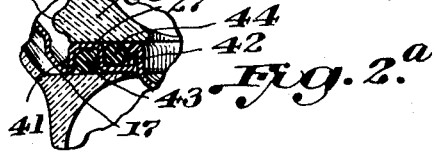
Fig. 2.ª
Inventors
Henry Kershaw
and Albert F. Pityo,
By BO/Whburn atty

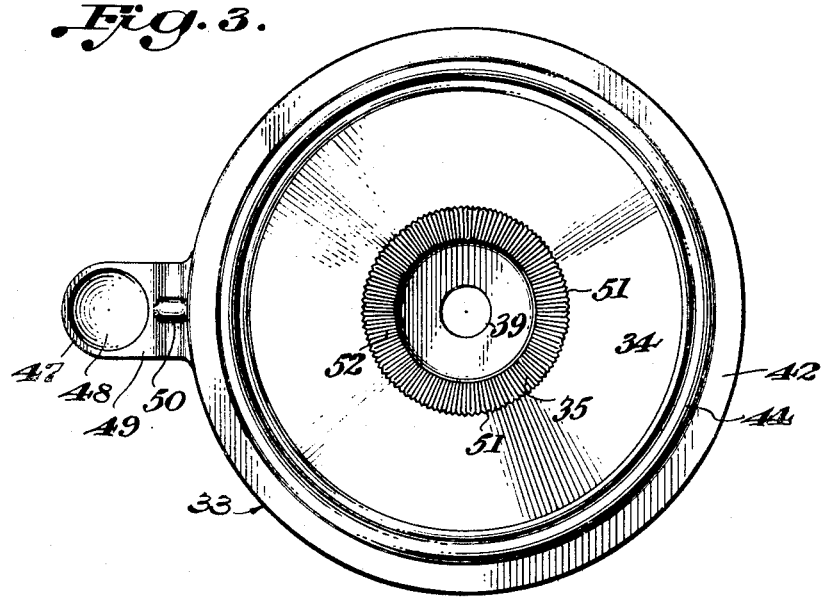
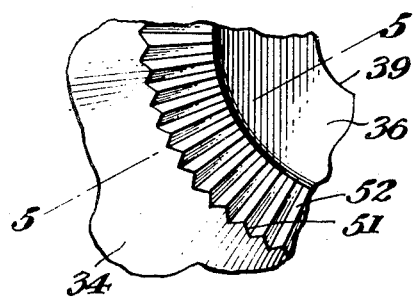
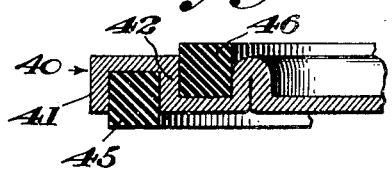
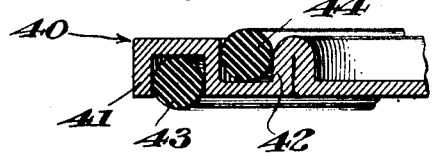
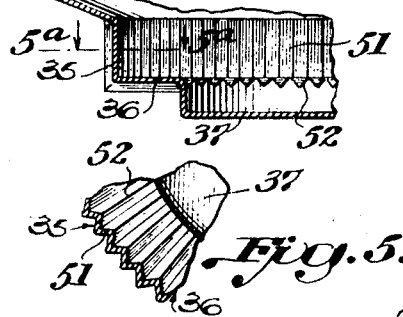

Patented Nov. 29, 1949

2,489,785

UNITED STATES PATENT OFFICE 2,489,785

COFFEE-MAKING APPARATUS

Henry Kershaw, Belleville, and Albert F. Pityo, Clifton, N. J.

Application July 11, 1945, Serial No. 604,450

3 Claims. (Cl. 99—292)

Our invention relates to a coffee making apparatus.

An important object of the invention is to provide means whereby an increased surface is afforded for providing a correspondingly increased pressure for forcing the water from the lower receptacle into the upper receptacle.

A further object of the invention is to provide means for increasing the saturation of the coffee in the minimum time.

A further object of the invention is to provide means for detachably connecting the tube with the upper receptacle.

A further object of the invention is to provide a coffee making apparatus having an upper receptacle provided with a flat bottom for support upon a table or the like, when separated from the tube.

A further object of the invention is to provide restraining means of increased capacity so that the liquid will quickly return from the upper receptacle to the lower receptacle.

A further object of the invention is to provide the upper and lower receptacles with large openings for expediting cleaning.

A further object of the invention is to provide apparatus of the above mentioned character having a large heating surface.

A further object of the invention is to provide simple and inexpensive means for locking the upper receptacle to the lower receptacle for forming a steam-tight joint, which will not work loose during the operation of the apparatus, and which will employ a small amount of rubber.

A further object of the invention is to provide means to seal off the rubber, during the coffee brewing period, preventing the hot water from contacting with the rubber.

A further object of the invention is to provide an apparatus of the above mentioned character, the various parts of which may be readily separated for the purpose of cleaning the same.

Other objects and advantages of the invention will be apparent during the course of the following description.

In the accompanying drawings forming a part of this application and in which like numerals are employed to designate like parts throughout the same, Figure 1 is a plan view of a coffee making apparatus embodying our invention, parts being broken away, Figure 2 is a central vertical section through the apparatus, Figure 3 is a plan view of the tube-carrying unit, Figure 4 is an enlarged fragmentary plan view of the tube-carrying unit, Figure 5 is a vertical section taken on line 5—5 of Figure 4, Figure 5a is a horizontal section taken on line 5a—5a of Figure 5, Figure 6 is a fragmentary vertical section through the marginal edge of the tube-carrying unit, upon an enlarged scale, showing the packing rings, Figure 7 is a similar view showing a modified form of packing rings, and Figure 2a is a fragmentary vertical section through the top and bottom of the upper and lower receptacles and associated elements, showing the upper receptacle drawn down to seal off the packing rings.

In the drawings, wherein for the purpose of illustration is shown a preferred embodiment of our invention, the numeral 10 designates a lower receptacle, which is preferably cup-shaped and circular in horizontal cross section and tapering downwardly, and having a flat bottom 11. This lower receptacle may be formed of glass, or other suitable material. Near its upper end, the receptacle has a horizontal groove 12, receiving a metal band 13, the ends of which are attached to a handle 14, formed of heat insulating material. Diametrically opposite the handle 14, the lower receptacle is provided with a spout 15, as shown. Arranged near the top of the receptacle 10 and at an elevation spaced below this top, is an internal flange 16, formed integral with the receptacle 10. This flange 16 is annular and provides a horizontal shoulder or face 17.

Arranged above the lower receptacle 10, is an upper receptacle 18, which is preferably inverted cup-shaped, and tapering upwardly. This upper receptacle may be formed of glass or any other suitable material. At its top, the upper receptacle has a flat portion 19, carrying upwardly projecting lugs 20, having vent apertures 21. Arranged upon the flat portion 19, is a knob or handle 22, preferably formed of heat insulating material, such as "Bakelite." This knob or handle has recesses 23 for receiving the lugs 20 and vent apertures 24 in communication with the vent apertures 21. The knob or handle is attached to the flat portion 19 by a bolt 25 or the like. The lugs 20 prevent the knob or handle 22 from turning with relation to the upper receptacle 18. At its bottom, the upper receptacle is thickened, forming an internal annular flange 26 having a lower flat horizontal face or shoulder 27.

The lower receptacle is provided near its upper end and above the shoulder 17 with internal circumferentially extending grooves 28 and 29, which are suitably inclined in opposite directions, like a screw thread. The spout 15 forms a vertical passage, open at its top and leading to the groove 28, while the lower receptacle has a vertical passage 30, open at its top and leading to the groove 29. The upper receptacle 18 is provided near and above the shoulder 27 with ribs or lugs 31 and 32, to be moved downwardly through the spout 15 and vertical passage 30, respectively, and to enter the grooves 28 and 29. When the upper receptacle 18 is applied to the lower receptacle 10, as shown in Figure 2, and the upper receptacle turned clockwise, the ribs 31 and 32 will enter the grooves 28 and 29, and the upper receptacle will be drawn down upon the lower receptacle and securely attached thereto. The lower receptacle is substantially open at its top or has a large opening, and the upper receptacle is substantially open at its bottom or has a large opening, and this will facilitate cleaning of the receptacles.

The numeral 33 designates a spout-carrying unit, which may be formed of sheet metal or the like. This unit 33 includes a bowl-shaped imperforate portion 34, having a cylindrical portion or chamber 35 formed upon its lower reduced end, and the chamber 35 has a bottom 36, which is horizontal, and is formed to produce an annular depressed portion 37, providing an annular space 38. The portion 37 has a vertical depending tube 39, secured thereto. The elements 34, 35, 36, 37 and 39, are preferably integral and are concentric. At its top, the bowl-shaped portion 34 has its material formed to provide a horizontal annular flange 40, and this annular flange, see more particularly Figures 6 and 7, is bent or formed to provide downwardly and upwardly facing U-shaped annular sockets or holding members 41 and 42. A resilient packing ring 43 is held within the annular socket 41 and projects outwardly below the same, while a resilient packing ring 44 is held within the annular socket 42 and projects upwardly beyond the same. These packing rings are formed of rubber or the like and are preferably circular in cross section. Instead of employing the packing rings 43 and 44 of Figure 6, we may employ resilient packing rings 45 and 46, which may be formed of rubber, and are square in cross section, Figure 7. These packing rings 45 and 46 are held within the annular sockets 41 and 42. As clearly shown in Figure 2, the packing ring 43 rests upon the shoulder 17, while the packing ring 44 engages the shoulder 27.

The bowl-shaped body portion 34 has a handle 47, preferably formed integral with the flange 40. This handle has an upper recess 48 for receiving the thumb and includes a vertically inclined shank 49, to enter the spout 15. This shank is stiffened or reinforced by a longitudinal rib 50, formed thereon, as shown.

Straining means are provided, to permit of the passage of the water from the lower receptacle into the upper receptacle and to prevent the passage of the ground coffee into the lower receptacle. To accomplish this, the chamber or cylindrical portion 35 is provided upon its periphery with fine vertical internal grooves 51, open at their tops and having their lower ends leading into fine horizontal grooves 52, formed upon the upper face of the bottom 36. These grooves are preferably V-shaped in cross section, and may have a maximum width as small as .010 of an inch, although their size may vary considerably. They should be sufficiently small or fine to prevent the ground coffee from passing through them, and their size may vary depending upon the degree of fineness that the coffee to be treated is ground. Adapted for insertion within the cylindrical portion or chamber 35, is a cylindrical disc 53, having an upstanding knob or handle 54. This disc is preferably formed of glass and is held in place by gravity or by frictional engagement with the cylindrical portion or chamber 35. The disc 53 has a lower flat face 55, to be arranged over the horizontal bottom 36 and cover the tops of the horizontal grooves 52. The disc 53 is provided upon its lower face with a circular recess 56, concentric therewith.

The operation of the apparatus is as follows:

The lower receptacle 10 is partly filled with water up to the elevation as indicated, although this elevation may be varied. The disc 53 is placed in position within the cylindrical chamber or portion 35 and the ground coffee is introduced into the bowl-shaped body portion 34 and covers the disc 53. The tube-carrying unit 33 is now introduced into the lower receptacle 10 and the packing ring 43 rests upon the horizontal shoulder 17, while the lower end of the tube 39 is submerged in the water. The handle 47 extends through the spout 15, as shown in Figure 2. The tube-carrying unit may first be introduced into the lower receptacle and the ground coffee subsequently introduced into the bowl-shaped portion 34, if desired. The upper receptacle 18 is now applied to the top of the lower receptacle, and the ribs 31 and 32 pass through the spout 15 and vertical passage 30, respectively, after which the upper receptacle is turned clockwise with relation to the lower receptacle. This compresses the lower packing ring 43 against the horizontal shoulder 17 and the upper packing ring 44 against the shoulder 27, forming gas-tight joints between the upper and lower receptacles and the tube-carrying unit. By further turning the upper receptacle 18 clockwise, it may be drawn down further so that the shoulder or face 27 will contact with the annular socket 42 and the shoulder 17 will contact with the annular socket 41. This will cover or seal off the rubber packing rings from the interior of the upper and lower chambers, thus preventing the water from contacting with these packing rings, in whole or in part, during the brewing period. With the parts thus assembled, heat is applied to the lower receptacle 10, and as pressure builds up within this lower receptacle, the water is forced upwardly from the lower receptacle through the tube 39 and discharges into the bowl-shaped body portion 34 and upper receptacle, to contact with the ground coffee. The pressure within the upper receptacle 18 does not exceed atmospheric pressure, as the interior of the upper receptacle is in communication with the atmosphere, through apertures 21 and 24. After practically all of the water has passed from the lower receptacle 10 into the upper receptacle 18 and after the coffee has been brewed for a suitable length of time, heat is removed from the lower receptacle, and the pressure is reduced in the lower receptacle and a vacuum created therein, and the water returns into the lower receptacle due to the action of the vacuum and gravity. The grooves 51 and 52 and the disc 53 constitute the straining means, which permits of the passage of the water, and prevents the passage of the ground coffee into the lower receptacle.

When the brewed coffee is collected in the lower receptacle, the upper receptacle is turned counter-clockwise with respect to the lower receptacle and separated therefrom. The upper receptacle may be supported upon a table or the like upon its shoulder 27. The tube-carrying unit 33 is now separated from the lower receptacle 10. The upper receptacle may again be applied to the lower receptacle.

A particular advantage in our construction is that the tube-carrying unit is separate from the upper receptacle, and being formed of metal, will not readily break, as frequently occurs with the glass tube of the conventional coffee brewing device. The upper receptacle may be applied to the lower receptacle and will then serve as a cover to aid in retaining the brewed coffee hot, or the upper receptacle may not be again applied to the lower receptacle. The lower receptacle is manipulated by the handle 14 to pour the brewed coffee through the spout 15.

It is to be understood that the form of our invention herewith shown and described is to be taken as a preferred example of the same, and that various changes in the shape, size and arrangement of parts may be resorted to without departing from the spirit of our invention or the scope of the subjoined claims.

Having thus described our invention, what we claim is:

1. A coffee making apparatus, comprising a lower receptacle open at its top, the lower receptacle having an internal generally horizontal shoulder near its top and inclined grooves upon its inner face above the shoulder, said lower receptacle having a vertical recess leading into the inclined grooves and a spout spaced from the vertical recess and leading into the inclined grooves, an upper receptacle having its lower end open and provided with an internal generally horizontal shoulder adjacent to its bottom and having exterior ribs to be inserted through the vertical recess and spout and brought into the inclined grooves, an imperforate coffee receiving receptacle to be passed into the lower receptacle, sealing means carried by the marginal edge of the coffee receiving receptacle and arranged between the shoulders of the upper and lower receptacles to support the coffee receiving receptacle and forming a gas tight joint between the upper and lower receptacles, a handle attached to the coffee receiving receptacle and extending to the exterior of the lower receptacle through the spout, straining means carried by the coffee receiving receptacle, and a depending tube connected with the straining means.

2. A coffee making apparatus, comprising a lower receptacle having its top open and provided adjacent to the open top with a substantially horizontal wide inwardly projecting shoulder, an upper receptacle having its bottom open and provided adjacent to such open bottom with a substantially horizontal wide inwardly projecting shoulder, the second shoulder being adapted to be arranged near and above the first shoulder, a unit separate from the lower and upper receptacles and comprising a coffee receiving receptacle and a depending tube to be submerged in the water within the lower receptacle, a substantially horizontal wide flange carried by the upper end of the coffee receiving receptacle and projecting outwardly beyond the same, the flange being formed into upwardly and downwardly facing sockets, the sockets having side walls, the flange being arranged between the wide shoulders, compressible packing rings arranged within the sockets and adapted to project outwardly beyond the same, and means to draw the upper receptacle toward the lower receptacle, the arrangement being such that the shoulders engage the packing rings and compress the same and may then contact with parts of the sockets whereby the packing rings are substantially covered against contact with the water.

3. A coffee making apparatus, comprising a lower receptacle having its top open and provided adjacent to the open top with a substantially horizontal wide shoulder, an upper receptacle having its bottom open and provided adjacent to such open bottom with a substantially horizontal wide shoulder, the second shoulder being adapted to be arranged near and above the first shoulder, the upper receptacle having screw threaded engagement with the lower receptacle, a knob secured to the top of the upper receptacle to turn it, a unit separate from the lower and upper receptacles and comprising a coffee receiving receptacle and a depending tube, a substantially horizontal wide flange carried by the coffee receiving receptacle and arranged between the shoulders, the flange being formed into upwardly and downwardly facing sockets having side walls, and compressible packing rings arranged within the sockets and adapted to project outwardly beyond the same.

HENRY KERSHAW.
ALBERT F. PITYO.

REFERENCES CITED

The following references are of record in the file of this patent:

UNITED STATES PATENTS

| Number | Name | Date |
|---|---|---|
| 75,045 | Nason | Mar. 3, 1868 |
| 725,193 | Atkins | Apr. 14, 1903 |
| 850,710 | Wojidkow | Apr. 16, 1907 |
| 960,419 | Selg | June 7, 1910 |
| 1,068,212 | Bodascher | July 22, 1913 |
| 1,077,289 | Nash | Nov. 4, 1913 |
| 1,108,288 | Watson | Aug. 25, 1914 |
| 1,794,639 | Nevius | Mar. 3, 1931 |
| 1,822,238 | Albanese | Sept. 8, 1931 |
| 2,234,397 | Bentz | Mar. 11, 1941 |
| 2,289,498 | Hons | July 14, 1942 |
| 2,325,912 | Lehmann | Aug. 3, 1943 |
| 2,345,146 | Perlusz et al. | Mar. 28, 1944 |
| 2,389,117 | Bensel | Nov. 20, 1945 |

FOREIGN PATENTS

| Number | Country | Date |
|---|---|---|
| 501,867 | Great Britain | Mar. 7, 1939 |
| 797,719 | France | Feb. 17, 1936 |
| 807,238 | France | Oct. 12, 1936 |